United States Patent
Resnick

(10) Patent No.: US 8,011,023 B2
(45) Date of Patent: Sep. 6, 2011

(54) COMPACT PROTECTIVE HOOD WITH FOLD LINES

(76) Inventor: Todd A. Resnick, Stuart, FL (US)

( * ) Notice: Subject to any disclaimer, the term of this patent is extended or adjusted under 35 U.S.C. 154(b) by 96 days.

(21) Appl. No.: 12/482,039

(22) Filed: Jun. 10, 2009

(65) Prior Publication Data

US 2010/0313338 A1 Dec. 16, 2010

(51) Int. Cl.
*A42B 1/04* (2006.01)
*A42B 1/06* (2006.01)
*A42B 1/00* (2006.01)

(52) U.S. Cl. .................. 2/202; 2/203; 2/204; 2/205

(58) Field of Classification Search ............... 2/202–205
See application file for complete search history.

(56) References Cited

U.S. PATENT DOCUMENTS

| | | | | |
|---|---|---|---|---|
| 3,731,320 A * | 5/1973 | White et al. | ...... | 2/205 |
| 3,747,124 A * | 7/1973 | Zientara | ...... | 2/202 |
| 3,818,158 A * | 6/1974 | Nakanishi | ...... | 2/48 |
| 3,968,521 A * | 7/1976 | Bashlow | ...... | 2/203 |
| 4,031,567 A * | 6/1977 | Planck | ...... | 2/204 |
| 4,091,467 A * | 5/1978 | Zuccaro et al. | ...... | 2/171 |
| 4,176,409 A * | 12/1979 | Everitt | ...... | 2/173 |
| 4,190,907 A * | 3/1980 | Cruickshank | ...... | 2/202 |
| 4,232,403 A * | 11/1980 | Burtis | ...... | 2/204 |
| 4,453,276 A * | 6/1984 | Smith et al. | ...... | 2/204 |
| 4,468,818 A * | 9/1984 | Flannery | ...... | 2/207 |
| 4,593,417 A * | 6/1986 | Brown et al. | ...... | 2/172 |
| 4,599,749 A * | 7/1986 | Childs et al. | ...... | 2/204 |
| 4,697,289 A * | 10/1987 | Luigi | ...... | 2/422 |
| 4,757,813 A | 7/1988 | Haydu | | |
| 4,768,235 A * | 9/1988 | Webster | ...... | 2/205 |
| 4,870,959 A * | 10/1989 | Reisman et al. | ...... | 128/201.25 |
| 4,935,966 A * | 6/1990 | Hosouchi et al. | ...... | 2/202 |
| 4,979,236 A * | 12/1990 | Merrill et al. | ...... | 2/4 |
| 5,035,006 A * | 7/1991 | Hetz et al. | ...... | 2/209.11 |
| 5,091,993 A * | 3/1992 | Merrill et al. | ...... | 2/4 |
| 5,206,958 A * | 5/1993 | Widenback | ...... | 2/457 |
| 5,309,574 A * | 5/1994 | Balaban et al. | ...... | 2/202 |
| 5,438,705 A * | 8/1995 | Mendez et al. | ...... | 2/4 |
| 5,546,604 A * | 8/1996 | Geller | ...... | 2/202 |
| 5,864,887 A * | 2/1999 | Kozawa | ...... | 2/174 |
| 5,875,775 A * | 3/1999 | Nur et al. | ...... | 128/201.28 |
| 5,946,729 A * | 9/1999 | Sakurai et al. | ...... | 2/202 |
| 6,070,580 A | 6/2000 | McDonald et al. | | |
| 6,123,077 A | 9/2000 | Bostock et al. | | |
| 6,302,103 B1 * | 10/2001 | Resnick | ...... | 128/201.23 |
| 6,305,029 B1 * | 10/2001 | Reynolds | ...... | 2/422 |
| 6,345,395 B1 * | 2/2002 | Chilton | ...... | 2/183 |
| 6,371,116 B1 * | 4/2002 | Resnick | ...... | 128/206.24 |
| 6,374,418 B1 * | 4/2002 | Rindle | ...... | 2/202 |
| 6,443,155 B1 | 9/2002 | McDonald et al. | | |
| 6,484,722 B2 | 11/2002 | Bostock et al. | | |

(Continued)

OTHER PUBLICATIONS

80K Survivair Masks to the Pentagon, ISHN, (2003), vol. 37-5, Business New Publishing Company.

(Continued)

*Primary Examiner* — Bobby Muromoto, Jr.

(74) *Attorney, Agent, or Firm* — Anton J. Hopen; Smith & Hopen, P.A.

(57) ABSTRACT

A compact protective hood comprising a pre-molded, substantially non-elastic crown having at least one preformed fold line whereby the package size of the hood is reduced by folding the hood along the at least one preformed fold line.

20 Claims, 9 Drawing Sheets

U.S. PATENT DOCUMENTS

| | | | |
|---|---|---|---|
| 6,536,434 B1 | 3/2003 | Bostock et al. | |
| 6,672,307 B2 | 1/2004 | McDonald et al. | |
| 6,701,925 B1 * | 3/2004 | Resnick | 128/206.17 |
| 6,722,366 B2 | 4/2004 | Bostock et al. | |
| 6,735,783 B2 * | 5/2004 | Phillips | 2/202 |
| 6,817,358 B1 * | 11/2004 | Resnick | 128/201.22 |
| 6,907,878 B1 * | 6/2005 | Resnick | 128/201.22 |
| 7,069,930 B2 | 7/2006 | Bostock et al. | |
| 7,178,526 B2 | 2/2007 | McDonald et al. | |
| 7,610,913 B1 * | 11/2009 | Resnick | 128/201.29 |
| 2005/0144702 A1 * | 7/2005 | Whitney | 2/202 |
| 2006/0048277 A1 * | 3/2006 | Yeadon | 2/204 |
| 2007/0266476 A1 * | 11/2007 | Ulrich | 2/202 |
| 2008/0083410 A1 * | 4/2008 | Resnick | 128/201.24 |
| 2008/0105255 A1 * | 5/2008 | Resnick | 128/201.23 |
| 2008/0282449 A1 * | 11/2008 | Grey et al. | 2/204 |
| 2009/0025119 A1 * | 1/2009 | Nespor | 2/84 |

OTHER PUBLICATIONS

Escape Respirator (Respiratory Protection), Occupational Hazards, (2004), vol. 66-1, Penton Media, Inc.

* cited by examiner

COMPACT PROTECTIVE HOOD WITH FOLD LINES

FIELD OF INVENTION

This invention relates to a compact protective escape hood design that provides pre-molded fold lines.

BACKGROUND OF THE INVENTION

Compact protective hoods enclose the head of a wearer in a crown either of transparent material or of opaque material with a transparent visor. Respiration is typically filtered through a mouth piece, oral-nasal cup or a full-face piece. The hood is sealed about the neck by an elastomeric dam. To make the storage package compact and portable the hood assembly must be folded for storage until deployment.

Protective hoods must operate effectively and reliably virtually every time. Inconsistencies in folding may negate the high protection factor of well-designed hoods. By analogy, the best designed parachute may be rendered ineffective by poor packing. Thus, even when a hood is designed and constructed to the highest specifications, the manual packing of the hood introduces an element of uncertainty into an otherwise highly governed process. Improper folding of protective hoods may lead to creasing or mechanical stress that creates a risk of leaks. At the same time, tight folding is a design requirement to keep the folded package size at a minimum.

A long-felt but unfulfilled need in the art exists for a hood that can be folded with a high degree of accuracy and reproducibility. Another need in the art exists to provide a hood that reduces the time and skill level required to fold the assembly to the requisite quality control target. Yet another need in the art exists to provide a compact protective hood that folds into a tight package but also provides semi-rigid structural support for hood accessories.

SUMMARY OF INVENTION

An embodiment of the invention includes a compact protective hood comprising at least one pre-molded fold line channel whereby folding made along the fold line channel produces an optimized packed configuration. The fold line channel is concave with the opposing surface of the fold line channel convex. This concavity/convexity allows the hood thickness to be uniform even along fold lines. The concavity/convexity also clearly indicates the direction of the fold to be made. This increases both efficiency and consistency in the packing process.

In yet another embodiment of the invention thickened panels may be integrally molded to the crown about the pre-molded fold lines. The panels are shaped to match the geometric shape of the crown area defined by the boundaries of the fold lines. As fold lines may intersect at various points a mosaic of panels may be formed into either the interior or exterior of the crown. As the panels align with the fold line mosaic the hood assembly may be packed into a compact unit while providing elements of rigidity in a deployed state. Panels may be used to support a variety of components including, but not limited to, filters, electronic communications, vision systems, cooling systems, drink conduits, and armor.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
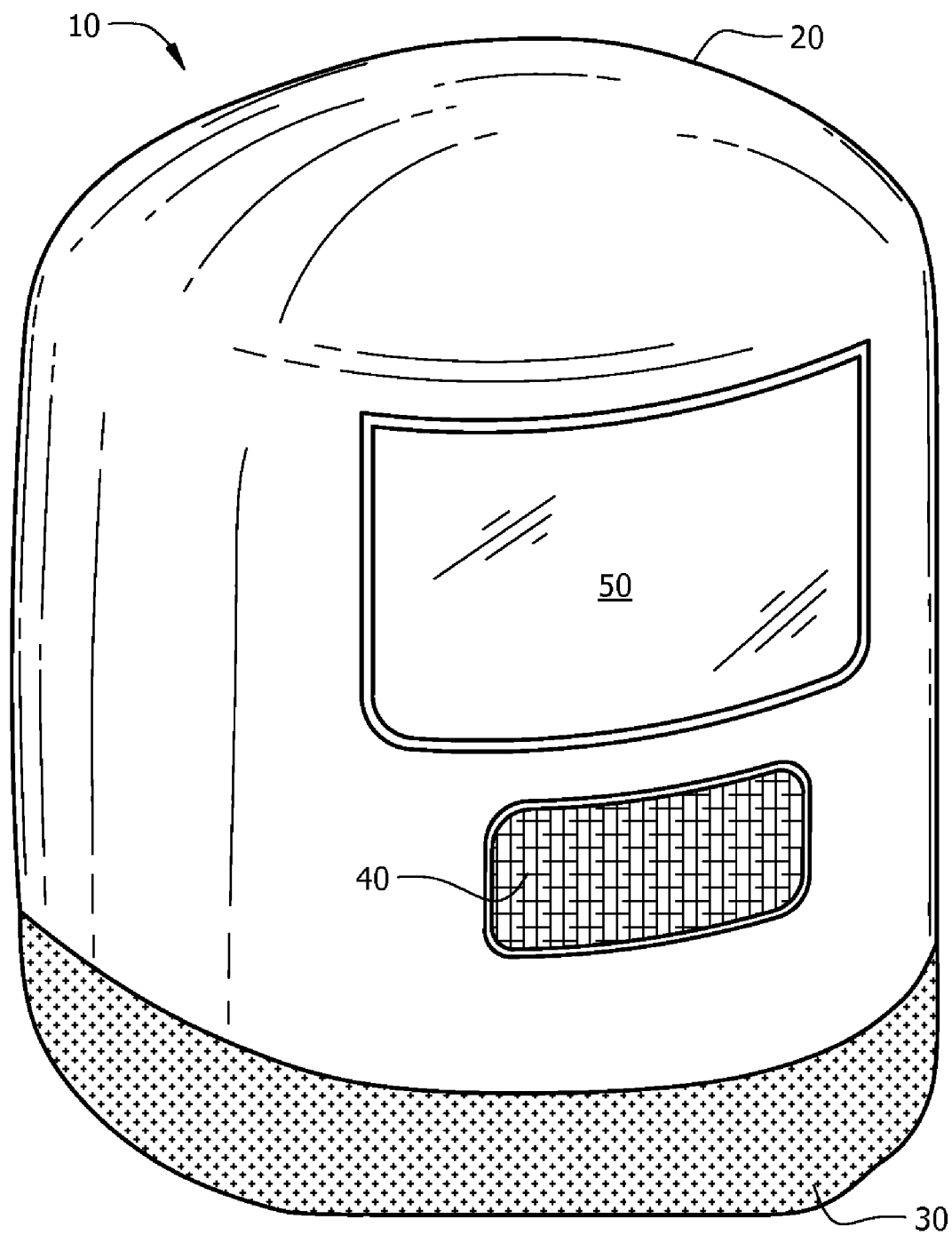
FIG. 1 shows a prior art compact protective hood.
Figure 2:
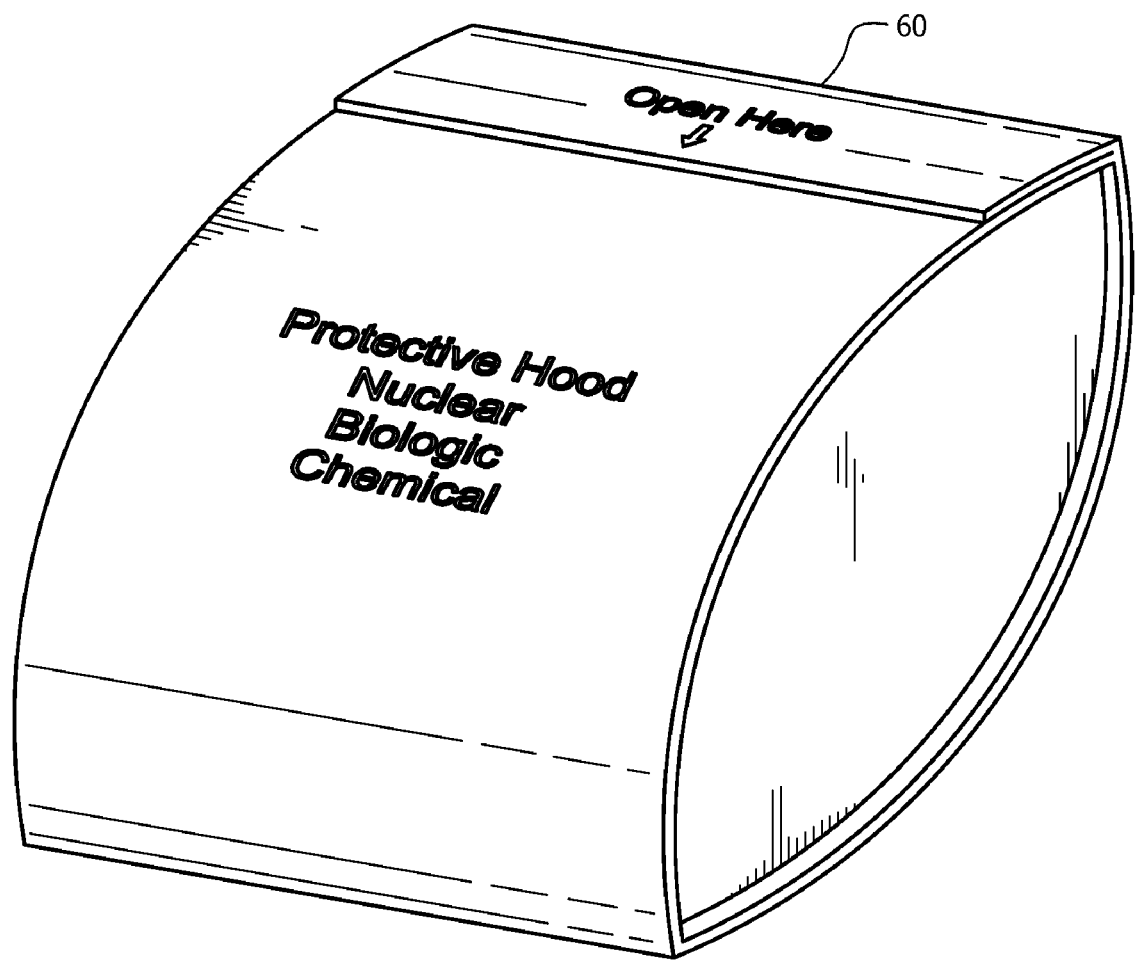
FIG. 2 shows a prior art compact protective hood in packaged form.

Prior art hood designs are shown in FIGS. 1-2. In FIG. 1, hood assembly 10 comprises upper crown 20 and lower elastomeric neck dam 30. Filter 40 and visor 50 are shown for illustrative purposes. In some hood designs, crown 20 is constructed of a plurality of composite panels stitched and/or taped together forming seams throughout crown 20. Additional seams exists at the interface between crown 20 and visor 50 as well as the interface between crown 20 and neck dam 30. These seams are subject to stress during initial packing, storage, unpacking, donning and actual use. Furthermore, various interfaces for respiration, drinking, communication and cooling may also be subject to similar stress. If a seam or interface is structurally compromised then the protection factor of the device may be sacrificed.

However, compact design is a necessity for many applications. If the hood cannot be reliably packed, stored and carried then it may not be logistically available in an emergency situation. In FIG. 2, a typical packing enclosure is shown wherein packed hood assembly 10 is inserted into package 60 which may also be vacuum-bagged to further reduce size.

Packing hood assembly 10 under prior art methods is labor-intensive and potentially subject to inconsistencies. Improperly located folds may stress seams, stress interfaces and/or crease optical materials such as those used in visors. Furthermore, as folds deviate from optimum locations, higher levels of training and quality control are necessary. This leads to higher costs of manufacture.

Figure 3:
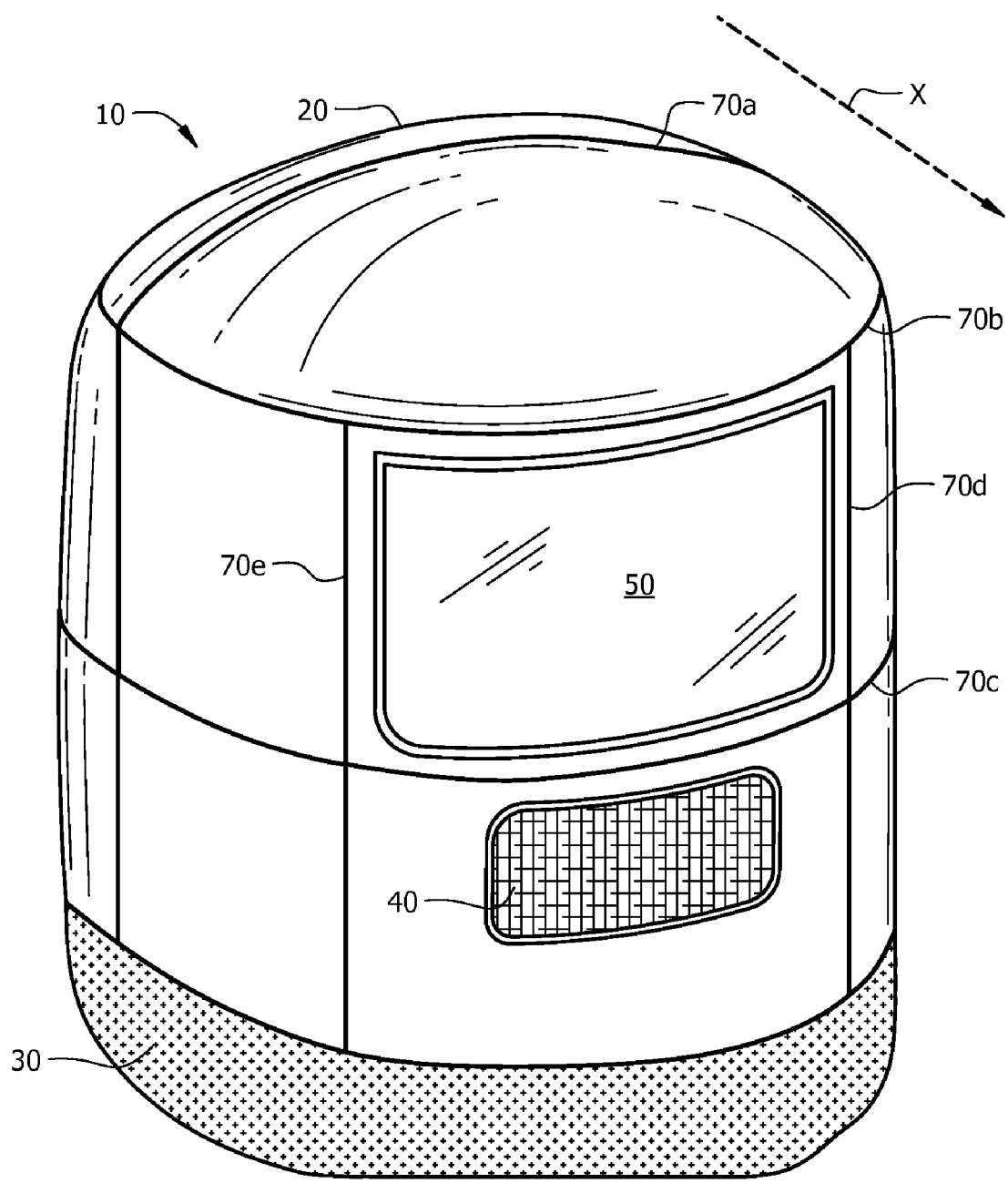
FIG. 3 is an elevated, isometric front view of a compact protective hood according to an embodiment of the invention.

As shown in FIG. 3 of an embodiment of the present invention, plurality of pre-molded fold lines 70A-E are shown in exemplary locations for illustrative purposes. Front facing orientation of hood assembly 10 is denoted as cranial direction X. Fold line 70A encircles crown 20 on a coronal plane. Fold line 70B encircles crown 20 on a horizontal plane above visor 50. Fold line 70C encircles crown 20 on a horizontal plane below visor 50. Fold line 70D runs on a cranial, left-offset sagittal plane, intersecting fold lines 70B and 70C. Fold line 70E runs on a cranial, right-offset sagittal plane, intersecting fold lines 70B and 70C.

Figure 4:
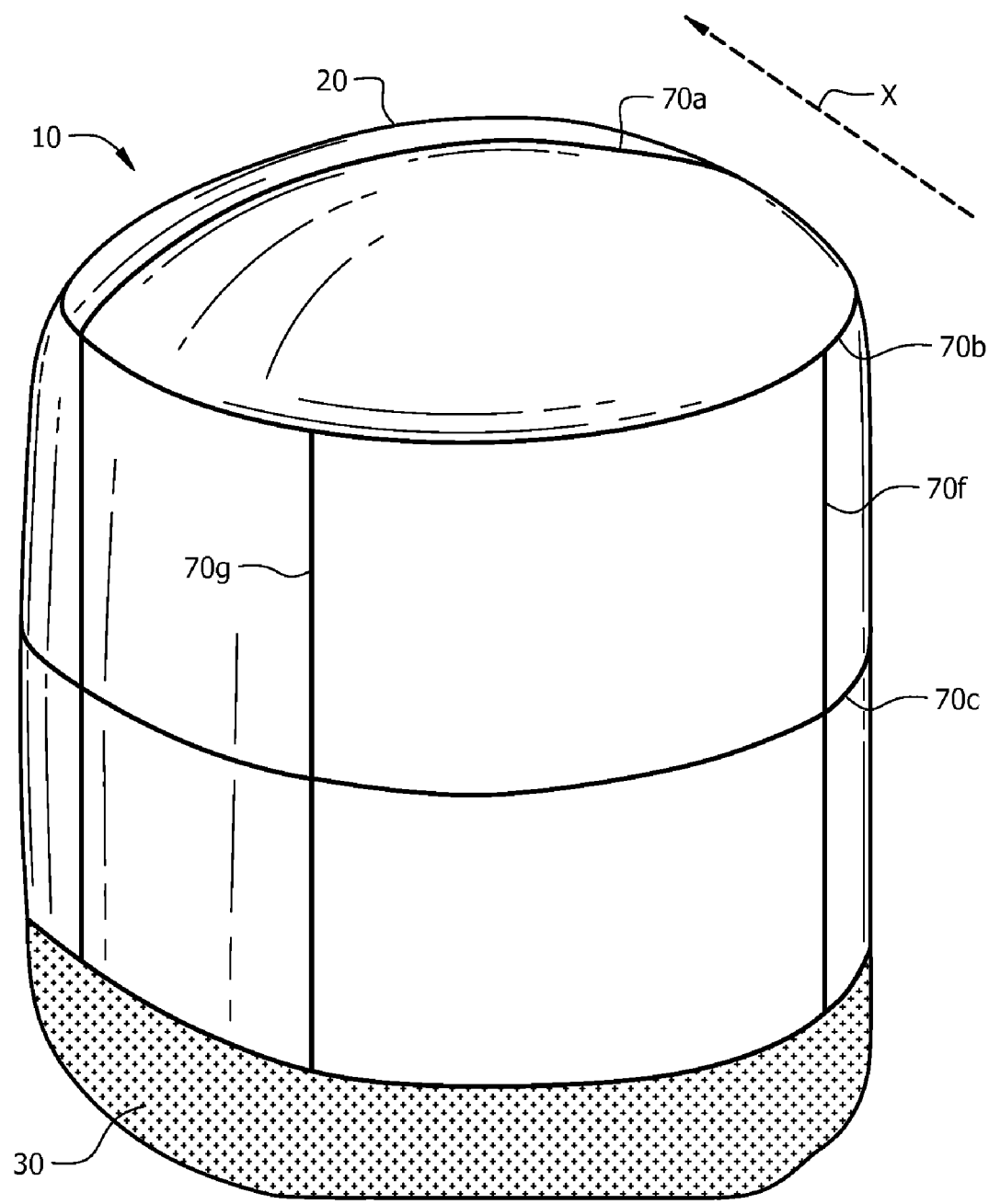
FIG. 4 is an elevated, isometric rear view of a compact protective hood according to an embodiment of the invention.

FIG. 4 is a rear view of hood assembly 10 showing fold line 70F running on a caudal, right-offset sagittal plane intersecting fold lines 70B and 70C. Fold line 70G runs on a caudal, left-offset sagittal plane, intersecting fold lines 70B and 70C on a second lateral side of visor 50.

Figure 5:
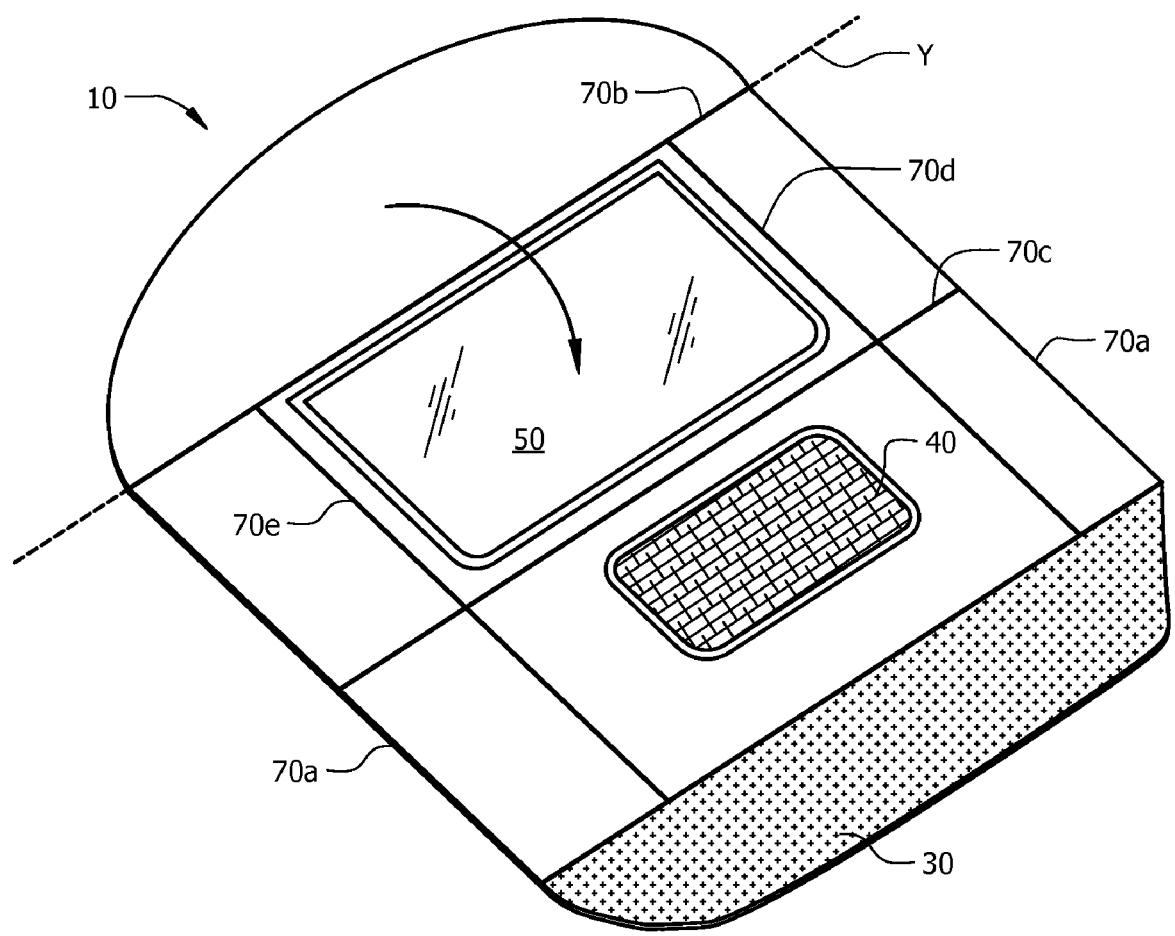
FIG. 5 is an elevated, isometric front view of a compact protective hood according to an embodiment of the invention flatted about a coronal plane.
Figure 6:
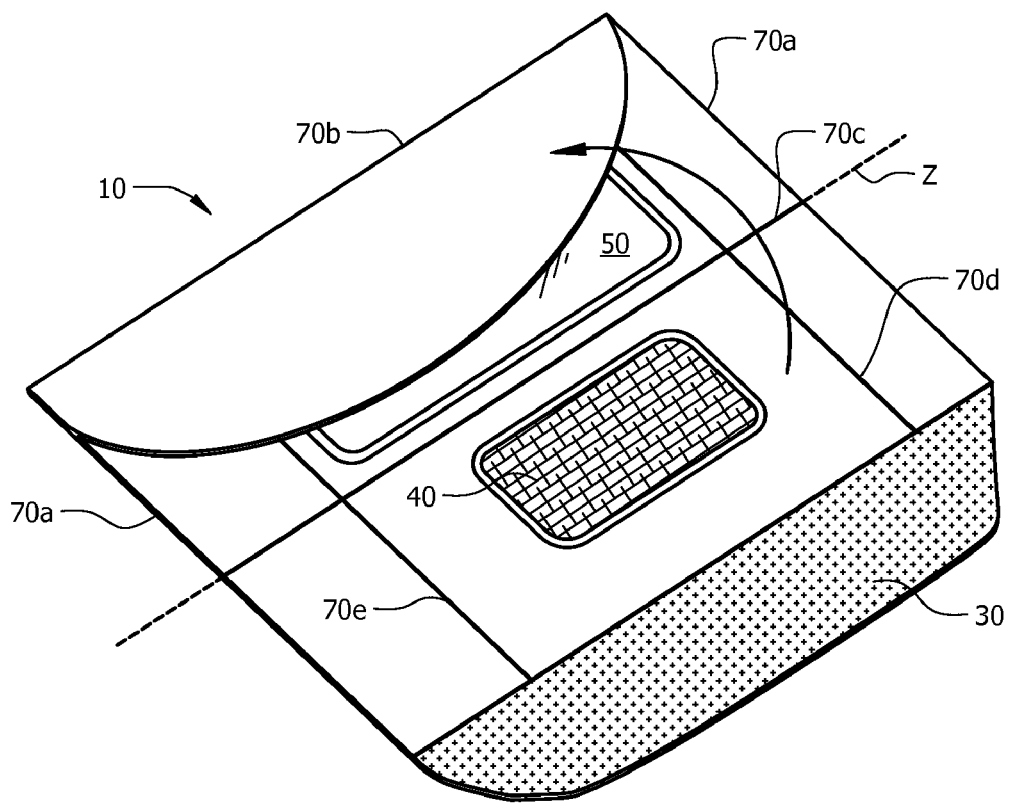
FIGS. 6-8 are elevated, isometric front views of a compact protective hood according to an embodiment of the invention flatted about a coronal plane and folded.
Figure 7:
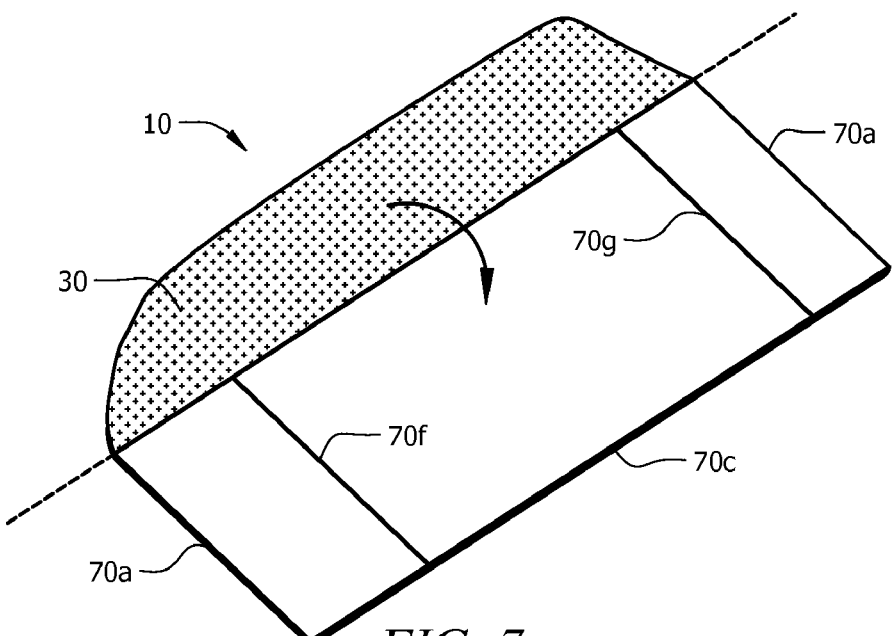
Figure 8:
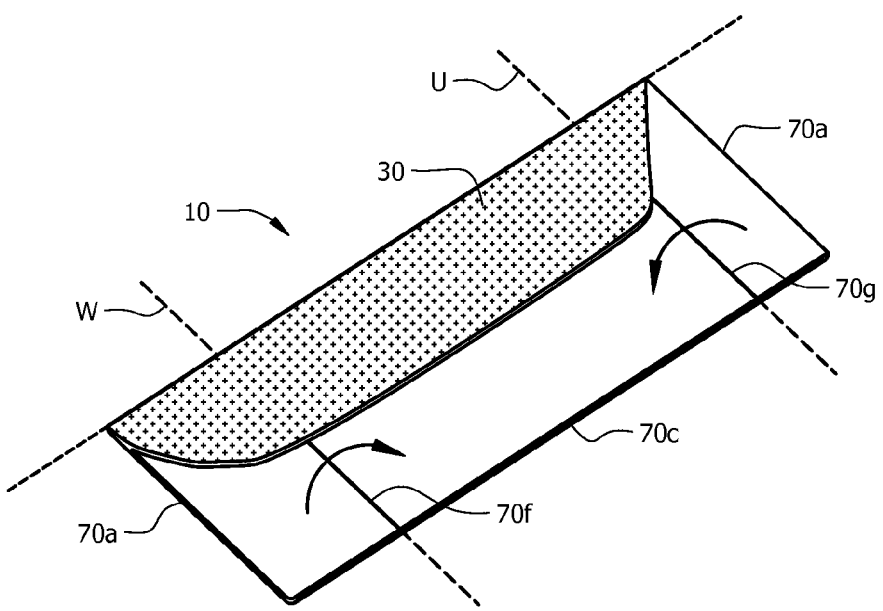

FIGS. 5-9 illustrate an exemplary folding process. In FIG. 5, a top portion of hood assembly 10 is folded over visor 50 about axis Y along fold line 70B. In FIG. 6, a bottom portion of hood assembly below visor 50 is prepared to be folded over the top portion about axis Z along fold line 70C. In FIG. 7, the bottom portion of hood assembly below visor 50 is folded along axis Z thereby overlapping top and bottom portions (already folded) of hood assembly 10. In FIG. 8, the lateral sides of hood assembly 10 are prepared to be folded inward along axis W of fold line 70F and axis U of fold line 70G.

Figure 9:
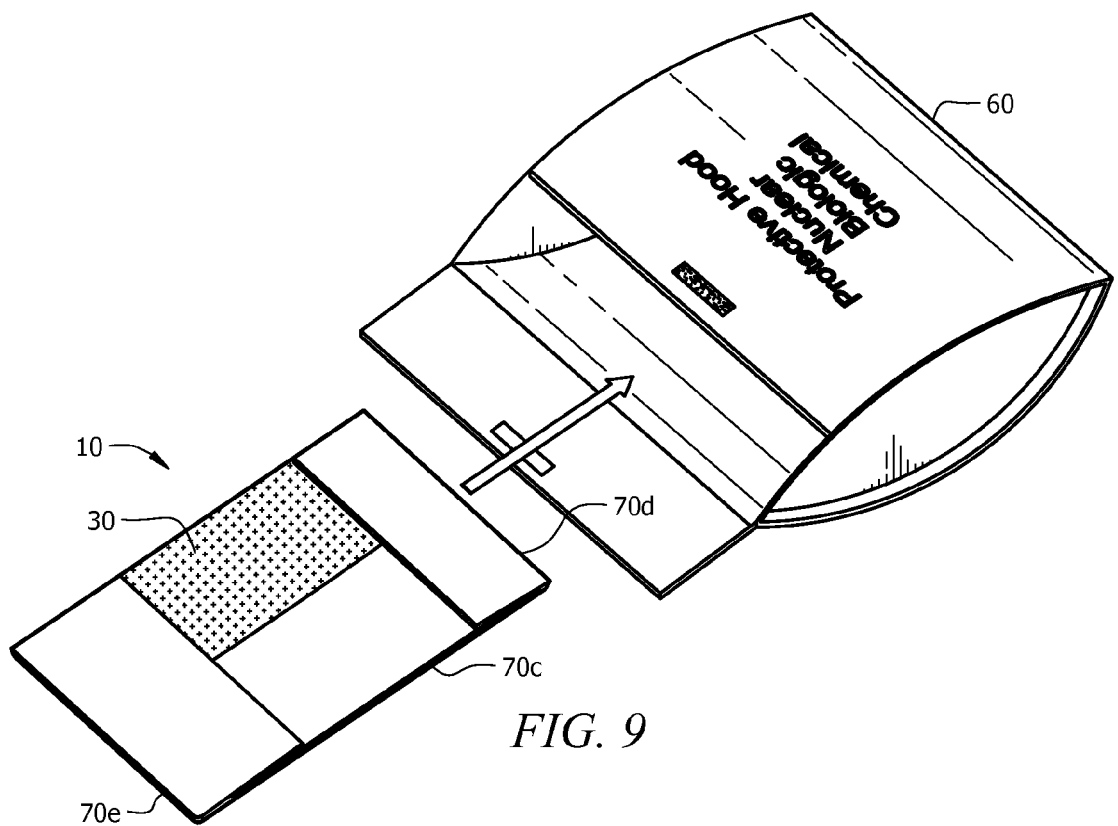
FIG. 9 is an elevated, isometric front view of a folded compact protective hood according to an embodiment of the invention being inserted into a package.

In FIG. 9, the lateral sides of hood assembly 10 are folded. Hood assembly 10 is inserted into package 60. It should be noted that the folding shown in FIGS. 5-9 are exemplary only. There are multiple ways to fold a hood and the optimal pattern may depend on the application. For example, a military application will likely require the smallest possible package size. A commercial application may allow a larger package size but will likely require a shorter donning time.

Figure 10:
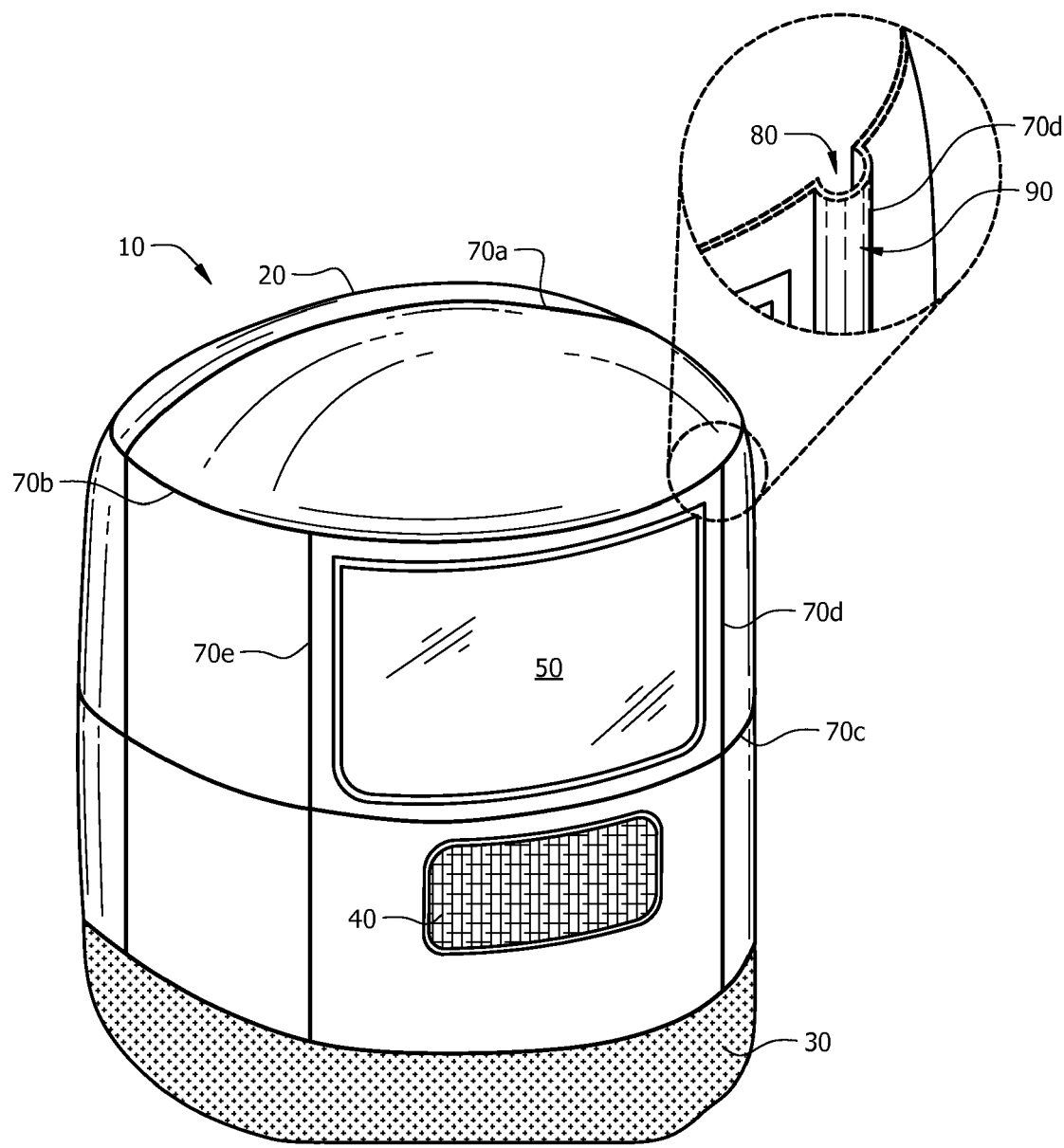
FIG. 10 is an elevated, isometric front view of a compact protective hood according to an embodiment of the invention showing a fold line detail.

In FIG. 10, a closer view of fold line 70D is provided. Exemplary concavity 80 and corresponding convexity 90 are formed when the hood is molded. Other fold line configurations may include V-shaped indentations, rectangular indentations, elliptical indentations or any other predetermined geometric shape that permits a mechanical fold to be performed. Molding of the fold lines may be varied so they have higher, similar or lesser thickness relative to the panels formed between fold lines. Thickening the area around the fold lines may be advantageous to counter mechanical stresses exerted during packing, unpacking and donning. Thinning of the fold lines during the molding process may facilitate folding.

Figure 11:
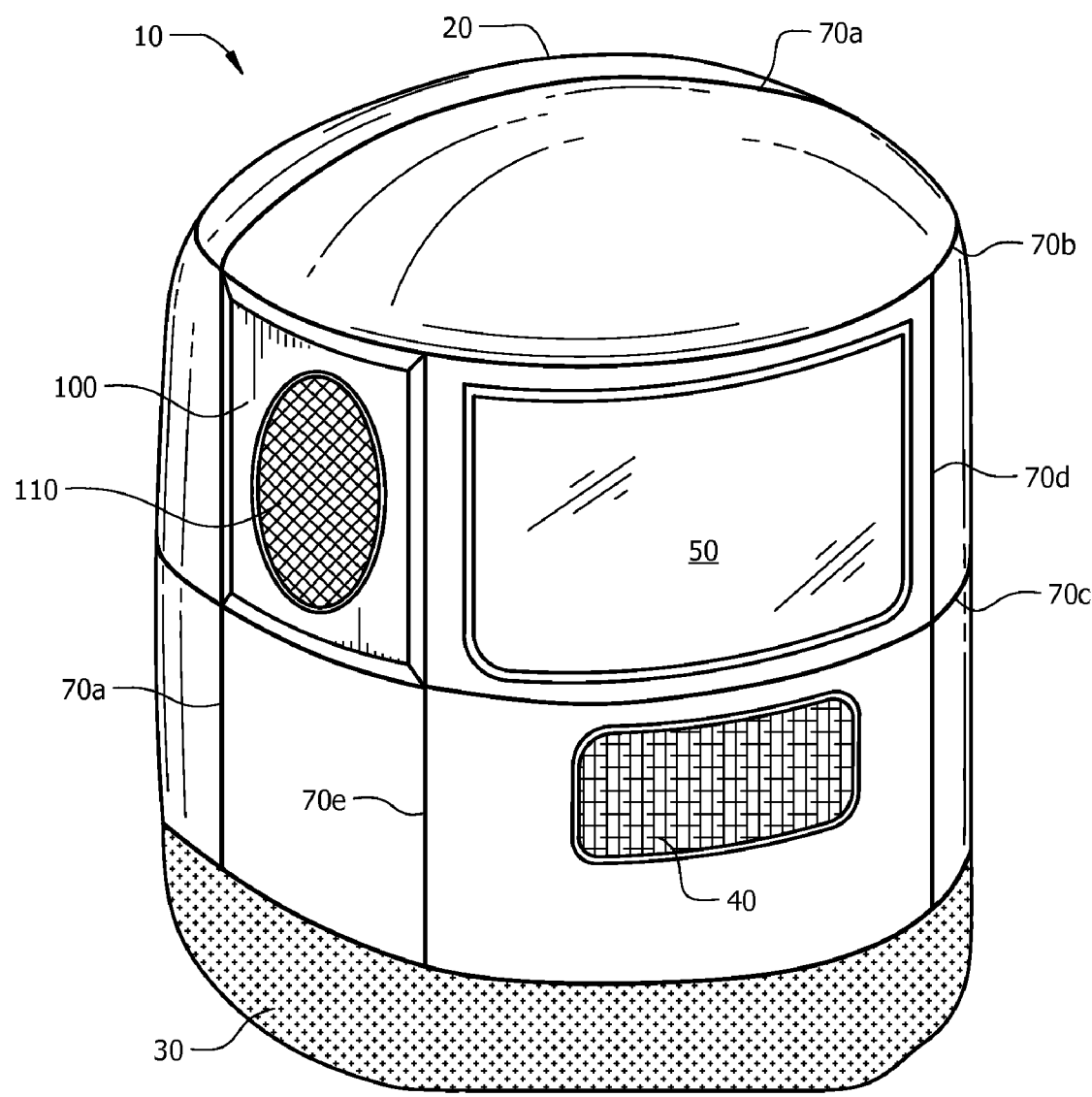
FIG. 11 is an elevated, isometric front view of a compact protective hood according to an embodiment of the invention showing a thickened panel section.

In FIG. 11, thickened panel 100 supports hood accessory 110. Hood accessory 110 may include, but is not limited to, armor, respiration, communication, imaging, drinking and/or cooling devices. Hood assembly 10 is molded having panels such as panel 100 of varying thickness to provide a heavier substrate upon which to mount, insert, affix or overlay items. Panel 100 borders fold line 70B at the top, fold line 70E to the right, fold line 70A to the left and fold line 70C at the bottom. Because panel 100 is constructed in view of a predetermined fold line pattern, it is not only compatible with the packing process, but actually facilitates packing along the planned fold line pattern. Panel 100 is defined by fold line boundaries in this example but may also bound other portions of the hood such as the neck dam, visor, filter or the like.

The fold lines are detectable both visually and tactilely which facilitates the packing process. As the fold lines are pre-molded in the fabrication process, the costs of producing the hood are not increased. However, packing time, training requirements, and folding inconsistencies are dramatically reduced.

The hood crown may be molded by a process including, but not limited to, injection molding, compression molding, transfer molding, thermoforming and dip molding.

An embodiment of the invention includes the method of molding the hood crown not only with pre-molded fold lines, but with the folds partially closed. When the material is removed from the mold, the hood crown is biased towards a semi-closed state. At equilibrium, the hood is between a fully packed state and a fully deployed state. Upon deployment, the hood is biased open by the head of the wearer. As the hood biases against the head of the wearer, less slack material is in motion and the noise level of the hood may be diminished. This may be a significant advantage in tactical situations such as those encountered by law enforcement and the military.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A compact protective hood, comprising:
   a crown; and
   at least one fold line disposed on said crown, said fold line including a pre-molded channel disposed along an extent of said fold line, wherein said pre-molded channel clearly indicates and facilitates a folding direction along said fold line for reducing a package size of said protective hood.

2. A compact protective hood as in claim 1, wherein the said at least one fold line encircles the said crown about a coronal plane.

3. A compact protective hood as in claim 1, wherein said at least one fold line encircles said crown about a horizontal plane.

4. A compact protective hood as in claim 1, wherein said at least one fold line is disposed along a sagittal plane.

5. A compact protective hood as in claim 1, further comprising;
   at least one panel disposed on said crown, said panel being defined by at least one fold line boundary and having a greater thickness relative to a remainder of said crown.

6. A compact protective hood as in claim 1, wherein said crown is substantially non-elastic.

7. A compact protective hood as in claim 1, further comprising:
   a visor disposed on said crown.

8. A compact protective hood as in claim 1, further comprising:
   a filter disposed on said crown.

9. A compact protective hood as in claim 1, further comprising:
   an elastomeric neck dam attached to said crown.

10. A compact protective hood as in claim 1, wherein said pre-molded channel is selected from the group consisting concavity/convexity indentations, v-shaped indentations, rectangular indentations, elliptical indentations, and any predetermined geometric shape that clearly indicates and facilitates a folding direction along said fold line.

11. A method of constructing a compact protective hood, comprising the steps of:
    providing a crown; and
    molding at least one fold line on said crown, said fold line including a channel disposed along an extent of said fold line, wherein said channel clearly indicates and facilitates a folding direction along said fold line for reducing a package size of said protective hood.

12. A method of constructing a compact protective hood as in claim 11, wherein said at least one fold line encircles said crown about a coronal plane.

13. A method of constructing a compact protective hood as in claim 11, wherein said at least one fold line encircles said crown about a horizontal plane.

14. A method of constructing a compact protective hood as in claim 11, wherein said at least one fold line is disposed along a sagittal plane.

15. A method of constructing a compact protective hood as in claim 11, further comprising the step of:
   incorporating at least one panel on said crown, said panel being defined by at least one fold line boundary and having a greater thickness relative to the remainder of said crown.

16. A method of constructing a compact protective hood as in claim 11, wherein said crown is substantially non-elastic.

17. A method of constructing a compact protective hood as in claim 11, further comprising the step of:
   incorporating a visor on said crown.

18. A method of constructing a compact protective hood as in claim 11, further comprising the step of:
   incorporating a filter on said crown.

19. A method of constructing a compact protective hood as in claim 11, further comprising the step of:
   incorporating an elastomeric neck dam on said crown.

20. A method of constructing a compact protective hood as in claim 11, wherein said pre-molded channel is selected from the group consisting concavity/convexity indentations, v-shaped indentations, rectangular indentations, elliptical indentations, and any predetermined geometric shape that clearly indicates and facilitates a folding direction along said fold line.

* * * * *